US005956656A

United States Patent [19]

Yamazaki

[11] Patent Number: 5,956,656

[45] Date of Patent: Sep. 21, 1999

[54] WIRELESS SELECTIVE CALL RECEIVER OPERABLE IN COVER CLOSING STATE

[75] Inventor: Yasuyuki Yamazaki, Shizuoka, Japan

[73] Assignee: NEC Corporation, Tokyo, Japan

[21] Appl. No.: 08/829,815

[22] Filed: Mar. 25, 1997

[30] Foreign Application Priority Data

Apr. 22, 1996 [JP] Japan .................................... 8-100025

[51] Int. Cl.[6] .............................. H04B 1/38; H04M 1/00; H04M 9/00

[52] U.S. Cl. ............................ 455/575; 455/90; 455/566; 340/825.44; 345/169; 379/433

[58] Field of Search .................................... 455/403, 550, 455/575, 90, 556, 566, 567, 38.1, 38.2, 38.4; 345/169, 901, 903, 905; 340/825.44; 379/433, 428, 429

[56] References Cited

U.S. PATENT DOCUMENTS

| | | | |
|---|---|---|---|
| 5,023,905 | 6/1991 | Wells et al. | 379/93.17 |
| 5,335,246 | 8/1994 | Yokev et al. . | |
| 5,381,132 | 1/1995 | Yun | 455/38.4 |
| 5,414,444 | 5/1995 | Britz | 455/31.1 |
| 5,452,829 | 9/1995 | King et al. . | |
| 5,584,054 | 12/1996 | Tyneski et al. | 455/89 |
| 5,588,041 | 12/1996 | Meyer, Jr. et al. | 455/569 |
| 5,710,576 | 1/1998 | Nishiyama et al. | 345/169 |

FOREIGN PATENT DOCUMENTS

| | | |
|---|---|---|
| 0 594 430 | 4/1994 | European Pat. Off. . |
| 0 594 459 | 4/1994 | European Pat. Off. . |
| 3-211923 | 9/1991 | Japan . |
| 4-123426 | 11/1992 | Japan . |
| 5-030166 | 2/1993 | Japan . |
| 5-30166 | 2/1993 | Japan . |
| 6-029906 | 2/1994 | Japan . |
| 7-42251 | 7/1995 | Japan . |
| 7-288855 | 10/1995 | Japan . |
| 8-56375 | 2/1996 | Japan . |
| 9-139968 | 5/1997 | Japan . |
| 9-181838 | 7/1997 | Japan . |

*Primary Examiner*—Nguyen Vo
*Assistant Examiner*—Edan Orgad
*Attorney, Agent, or Firm*—Young & Thompson

[57] ABSTRACT

A wireless selective call receiver includes a body section composed of a display panel, a control section having a memory and built in the body section, and an operation unit, and a cover section connected to the body section and composed of a hinged cover for protecting the display panel and a transparent window provided in correspondence with the display panel such that a display on the display panel can be seen through the transparent window in the cover when the cover is closed. The control section controls the display panel in response to an operation of the operation unit such that a message data is displayed on the display panel. The operation unit is operable in the cover closed state. The operation units may include some switches or a single switch for achieving the functions of the switches.

18 Claims, 5 Drawing Sheets

WIRELESS SELECTIVE CALL RECEIVER OPERABLE IN COVER CLOSING STATE

BACKGROUND OF THE INVENTION

1. Field of the Invention

The present invention relates to a wireless selective call receiver, and more particularly to a wireless selective call receiver which has a management function of data which contains telephone book data and scheduler data, and in which the contents which are displayed in a display section can be viewed when a cover for the display section is closed.

2. Description of the Related Art

In the conventional wireless selective call receiver, a function operation is performed by touching an operation panel with a finger.

FIGS. 1A and 1B are a flow chart for stopping a call receiving operation and a flow chart for confirming receipt of a message in an example of a conventional wireless selective call receiver, respectively.

Referring to FIG. 1A, the conventional wireless selective call receiver has a cover for body protection. In the reception wait state (step S501) in which the cover is closed, when its call number is received (step S502), the call receiving operation such as speaker ringing and so on is performed (step S503). Then, a user opens the cover (step S504) and then pushes a call receiving operation stop switch (step S505). As a result, the call receiving operation is stopped (step S506).

Next, refer to FIG. 1B, in order to confirm reception of a message, the user opens the cover of the wireless selective call receiver (step S507) and then pushes a message display switch (step S508) to display the message (step S509).

In this manner, in the conventional wireless selective call receiver, the user conveniently must open the cover of the wireless selective call receiver, when the call receiving operation is stopped after the call number is received and when the message is displayed.

On the other hand, as an example of the apparatus in which it is possible view a display when the cover is closed, there is known a "Portable Wireless Telephone Apparatus" which is disclosed in Japanese Laid Open Patent Disclosure (JP-A-Heisei 5-30166). In this portable wireless telephone apparatus, a transparent panel window is provided in a microphone flip section in correspondence to a display section of the body of the apparatus. Thus, a liquid crystal display section is covered by the transparent panel window in the state in which the microphone flip section is closed such that the liquid crystal display section can be protected and a liquid crystal display can be seen.

However, in this conventional portable wireless telephone apparatus, the contents which are displayed on the display section during a reception wait state are only the electric field strength of the communication link with a wireless communication base. Because the microphone flip section must be opened to reply to a call, protection of the liquid crystal surface can be expected only in the reception wait state. On the contrary, the wireless selective call receiver has the peculiar functions of the stop operation of a call receiving operation and the confirmation operation of a reception message. Therefore, the conventional wireless selective call receiver can not achieve these functions when the cover is closed.

SUMMARY OF THE INVENTION

The present invention is made in the light of the above-mentioned circumstances. An object of the present invention is to provide a method of receiving a call with a message data in which the stop operation of a call receiving operation and the confirmation operation of a reception message can be performed in the state in which a cover is closed, and a wireless selective call receiver for the method.

In order to achieve an aspect of the present invention, a wireless selective call receiver includes a body section composed of an display panel, a control section having a memory and built in the body section, and an operation unit, and a cover section connected to the body section and composed of a cover for protecting the display panel and a transparent window provided in correspondence with the display panel such that a display on the display panel can be seen through the transparent window in a cover closing state that the cover section is closed. The control section controls the display panel in response to an operation of the operation unit such that a message data is displayed on the display panel. The operation unit is operable in the cover closing state.

The operation unit includes a control switch for instructing stop of a call receiving operation to the control section, and for instructing display of a message to the control section. The control switch may further instruct power off to the control section. Alternatively, the operation unit may include a first control switch for instructing stop of a call receiving operation to the control section, and a second control switch for instructing display of a message to the control section. Further, the operation unit may include a third control switch that further instructs power off to the control section.

A first determining section determines whether a call is received in a call wait state, and an informing section of the control section informs to a user that the call is received when the call is received in the call receiving state. In this case, the control section includes a section for controlling the display panel to display a latest message data when the operation unit is operated in the call wait state.

A second determining section determines whether the operation unit is operated during the informing operation, and the control section includes a section for stopping the informing operation, for storing in the memory a message data received subsequently to the call, and for control the display panel to display the message data received subsequently to the call as a current message data, when the operation unit is operated during the informing operation. In this case, the control section includes section for storing the message data received subsequently to the call in the memory. After the storing of the message data, the control section is set to the call wait state when the operation unit is not operated during the informing operation.

A third determining section determines whether the operation unit is operated while the current message data is displayed, and the control section includes a section for controlling the display panel to sequentially display as current message data message data which have been already received and stored in the memory, each time the operation unit is operated while the current message data is displayed. When the operation unit is not operated while the current message data is displayed, the control section is set to the call wait state.

A fourth determining section determines whether the operation unit continues to be operated during a first predetermined time period, and the control section includes a section for controlling the display panel to display a power-off message data when the operation unit continues to be operated during the first predetermined time period.

A fifth determining section determines whether the operation unit is operated while the power-off message data is displayed, and the control section includes a section for turning off a power supply when the operation unit is not operated while the power-off message data is displayed, for controlling the display panel to perform a clock display when the operation unit is operated while the power-off message data is displayed, and for turning off the power supply when the operation unit is operated while the clock display is performed or after the clock display is performed during a second predetermined time period.

In order to achieve another aspect of the present invention, a method of receiving a call with a message data in a wireless selective call receiver, includes the steps of:

informing reception of a call with a message data to a user when the call is received in a call wait state;

displaying a message data on a display panel such that the user can see the message data through a transparent window in a cover closing state, wherein the transparent window is provided in correspondence with the display panel to a cover for protecting the display panel, and the cover is closed in the cover closing state; and stopping the informing operation in response to an operation of a first control switch which is operable in the cover closing state.

DESCRIPTION OF THE PREFERRED EMBODIMENTS

Next, a wireless selective call receiver of the present invention will be described with reference to the drawings.

Figure 2:
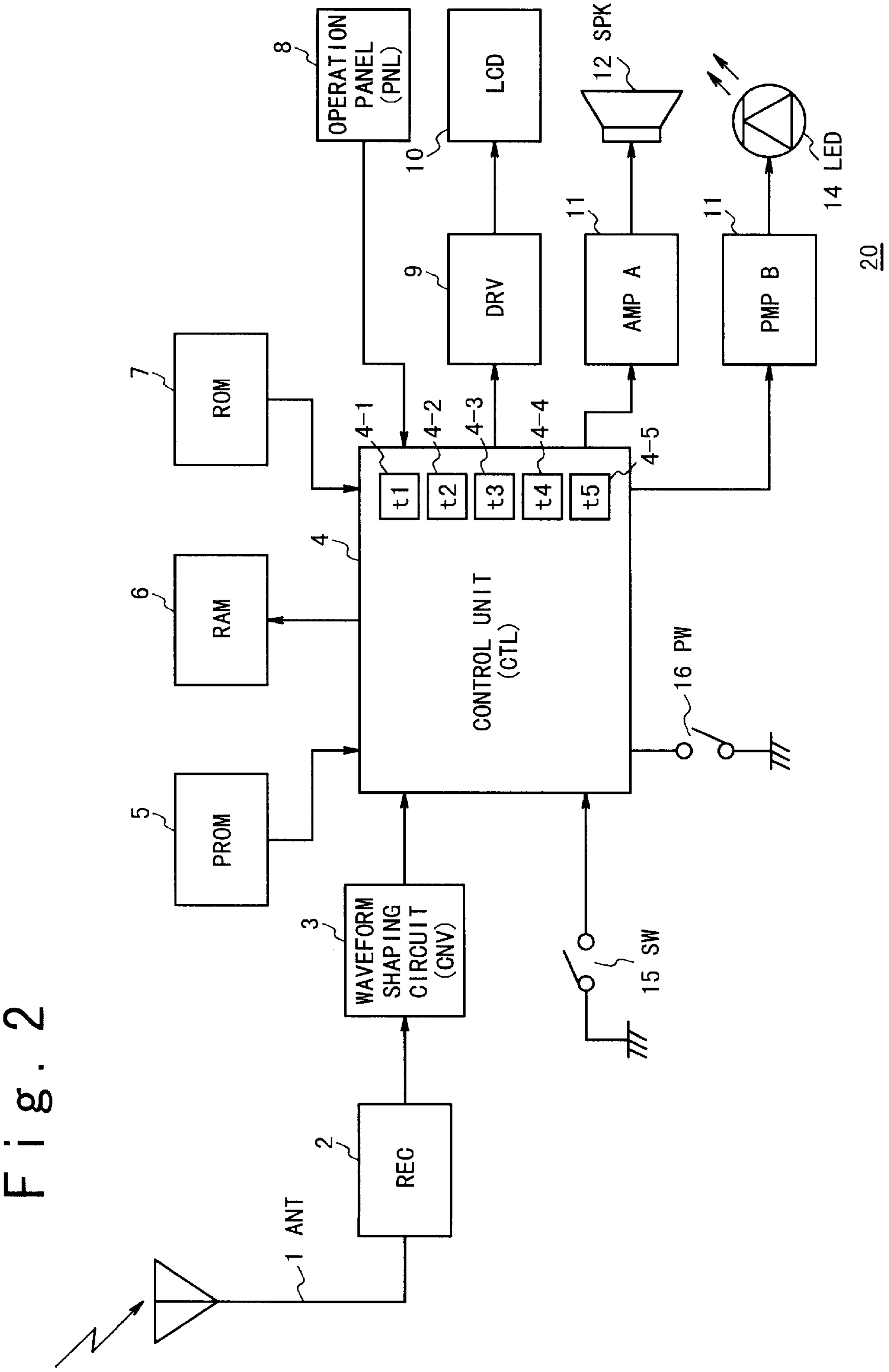
FIG. 2 is a block diagram illustrating the structure of a wireless selective call receiver according to the first embodiment of the present invention.
Figure 3:
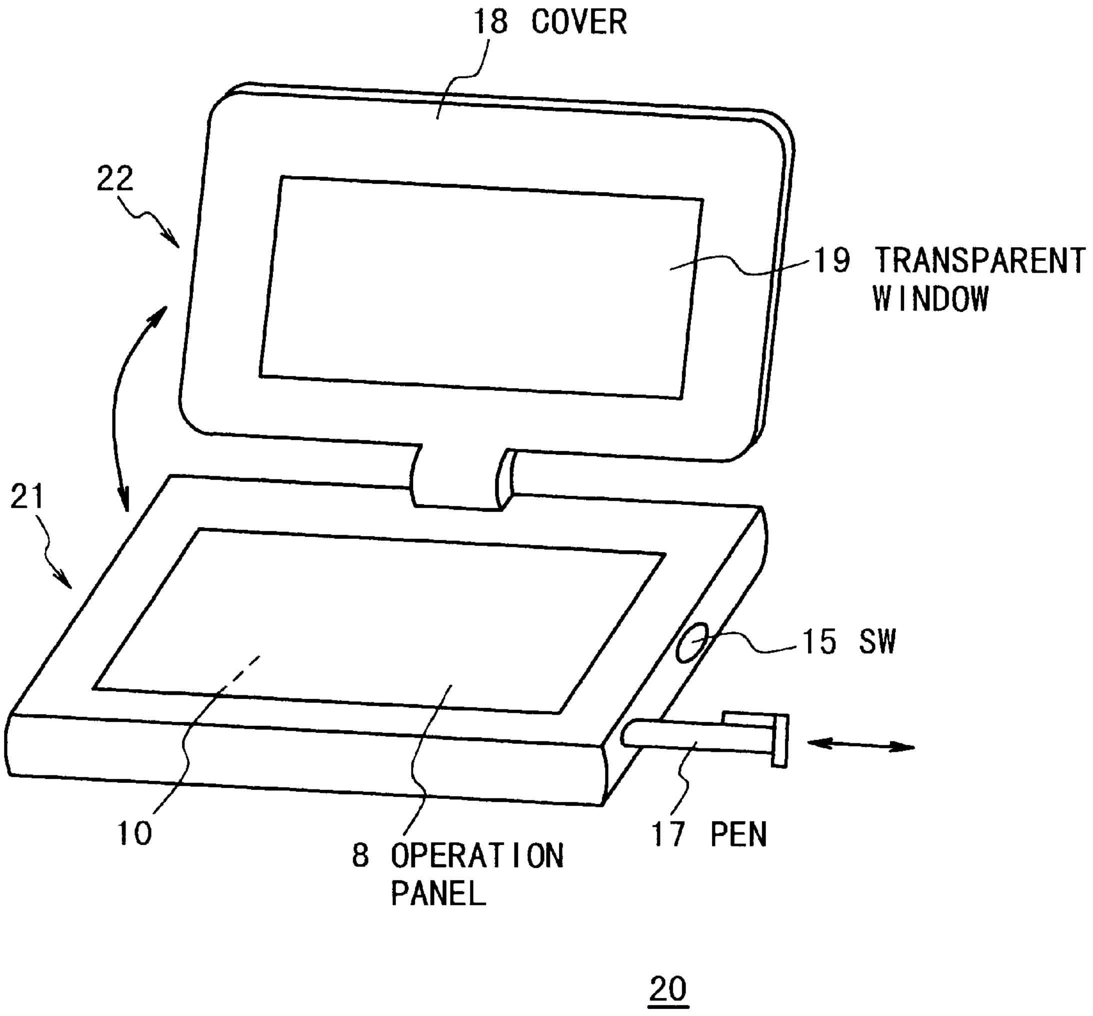
FIG. 3 is a perspective view which shows the outside appearance of the wireless selective call receiver shown in FIG. 1.

First, the wireless selective call receiver according to the first embodiment of the present invention will be described. FIG. 2 is a block diagram of the wireless selective call receiver according to the first embodiment of the present invention. FIG. 3 is a perspective view which shows the outside appearance of the wireless selective call receiver shown in FIG. 2.

Referring to FIG. 2, the wireless selective call receiver of the first embodiment of the present invention is composed of an antenna (ANT) 1, a receiving section (REC) 2, a waveform shaping circuit (CNV) 3, a control unit (CTL) 4, a programmable read only memory (PROM) 5, a random access memory (RAM) 6, a read only memory (ROM) 7, an operation panel (PNL) 8, a liquid crystal device (LCD) 10, an LCD driver (DRV) 9, a speaker 12, amplifiers (AMPA) 11 and (AMPB) 13, a light emitting diode (LED) 14, a control switch (SW) 15, and a power supply switch (PW) 16 for an electronic pocket diary function. The control unit (CTL) 4 includes timers 4-1 and 4-2 for counting time periods t1 and t2, respectivley.

The PROM 5 stores a selective call number of the wireless selective call receiver in advance, the RAM 6 stores telephone book data, scheduler data, message data which is analyzed by the control unit (CTL) 4 and so on, and the ROM 7 stores dictionary function data and so on in advance. The receiving section (REC) 2 receives a radio signal from a wireless communication base (not illustrated) through the antenna (ANT) 1 to amplify and demodulate the received signal. The waveform shaping circuit (CNV) 3 converts the demodulated signal into a digital signal. The operation panel (PNL) 8 is used for a user to input required data or instruction. The LCD driver (DRV) 9 outputs a display signal to the LCD 10 such that a reception message, a menu and so on are displayed. The amplifier (AMPA) 11 amplifies a speaker alert signal outputted from the control unit (CTL) 4 and the speaker (SPK) 12 outputs the speaker alert signal from the amplifier (AMPA) 11 with a loud sound. The amplifier (AMPB) 13 amplifies an LED alert signal outputted from the control unit (CTL) 4 and the LED 14 is lighted by the LED alert signal from the amplifier (AMPB) 13. The control unit (CTL) 4 performs the control of various sections of the wireless selective call receiver. The control switch (SW) 15 is used to instruct the control unit (CTL) 4 to control a stop operation of a call receiving operation and a confirmation operation of reception of a message.

Next, the structure of the wireless selective call receiver will be described with reference to FIG. 3. Referring to FIG. 3, the wireless selective call receiver 20 is composed of a body section 21 and a cover section 22. The body section 21 is composed of the LCD 10 and the operation panel 8 which is provided on the LCD 10. The body section 21 is further composed of the control switch (SW) 15 and a hole which are provided on the side wall. A pen 17 is accommodated in the hole. By touching the operation panel (PNL) 8 with the pen 17, data and instructions can be inputted to the control unit (CTL) 4. The cover section 22 is connected to the body section by a hinge and is composed of a cover 18 and a transparent window 19 which is provided in the center portion of the cover 18 in correspondence to the LCD 10 and the operation panel (PNL) 8. The cover 18 protects the operation panel (PNL) 8 from impact. The cover can be opened or about hinge. When the user pushes the control switch (SW) 15 in the state in which the cover 18 is closed, the contents of a message which is displayed on the display screen of the LCD 10 can be seen through the transparent window 19.

The wireless selective call receiver has a management function for the telephone book data and scheduler data. Also, the wireless selective call receiver has the structure by which the contents which are displayed on the LCD 10 can be seen through a transparent window 19 when cover 18 is closed. Further, the wireless selective call receiver has the structure by which a menu displayed on the LCD 10 can be performed by, for example, touching the operation panel (PNL) 8 by the pen 17 when cover 18 is closed.

Next, the function of each section of the wireless selective call receiver will be described with reference to FIGS. 2 and 3.

First, the radio signal is received by the antenna (ANT) 1 and is amplified and demodulated by the receiving section (REC) 2. The demodulated radio signal is converted into the digital signal which can read by the control unit (CTL) 4, by the waveform shaping circuit (CNV) 3. In the control unit (CTL) 4, the data signal outputted from the waveform shaping circuit (CNV) 3 and the selective call number of the call receiver read out from the PROM 5 are compared. When both are coincident with each other, the alert signal is outputted to the amplifier (AMPA) 11 and the amplifier (AMPB) 12 to inform the user that a call has been received.

Next, the control unit (CTL) 4 analyzes a message signal which follows the selective call number and outputs reception message data as the analysis result to LCD driver (DRV) 9. The LCD driver (DRV) 9 drives the LCD 10 such that the LCD 10 displays a reception message data on the display screen. Also, the control unit (CTL) 4 stores the reception message data in the RAM 6.

On the other hand, the amplifier (AMPA) 11 amplifies the speaker alert signal from the control unit (CTL) 4 to generate a speaker drive signal for driving the speaker (SPK) 12. The speaker (SPK) 12 converts the speaker drive signal into a sound signal to output an alert sound for informing the user of receiving a call. Also, the amplifier (AMPB) 13 amplifies the LED alert signal from the control unit (CTL) 4 to send out to the LED 14. The LED 14 is lighted in response to this LED alert signal to inform the user of the received call.

Note that although the switch (SW) 15 is used in common for the stop operation of the call receiving operation and the operation confirming receipt of message data, two independent switches may be provided in place of the single switch 15.

Next, the operation procedure of this wireless selective call receiver will be described below with reference FIG. 4. Operation procedure displayed on the LCD 10 by the control unit (CTL) 4. The user indirectly touches the operation panel (PNL) 8 through the transparent window 19 using the pen 17 to select one of the operation procedure data. The control unit (CTL) 4 recognizes the position of the operation panel (PNL) 8 touched by the user with the pen to execute the specified function operation.

Also, when telephone book data and scheduler data for an electronic pocket diary function are inputted from the operation panel (PNL) 8 with the pen 17, the control unit (CTL) 4 stores these data in the RAM 6. The control unit (CTL) 4 can read out these data in accordance with the touching operation to the operation panel (PNL) 8 to display on the LCD 10 again. Further, when the user inputs Kana letters through the touching operation to the operation panel (PNL) 8, the control unit (CTL) 4 refers to a dictionary function data previously stored in the ROM 7 to convert the Kana letters into a list of Kanji letters and to display the list of Kanji letters on the LCD 10. A desired Kanji letter is selected from among these Kanji letters by the user. This selection allows a Kanji data input.

Figure 4:
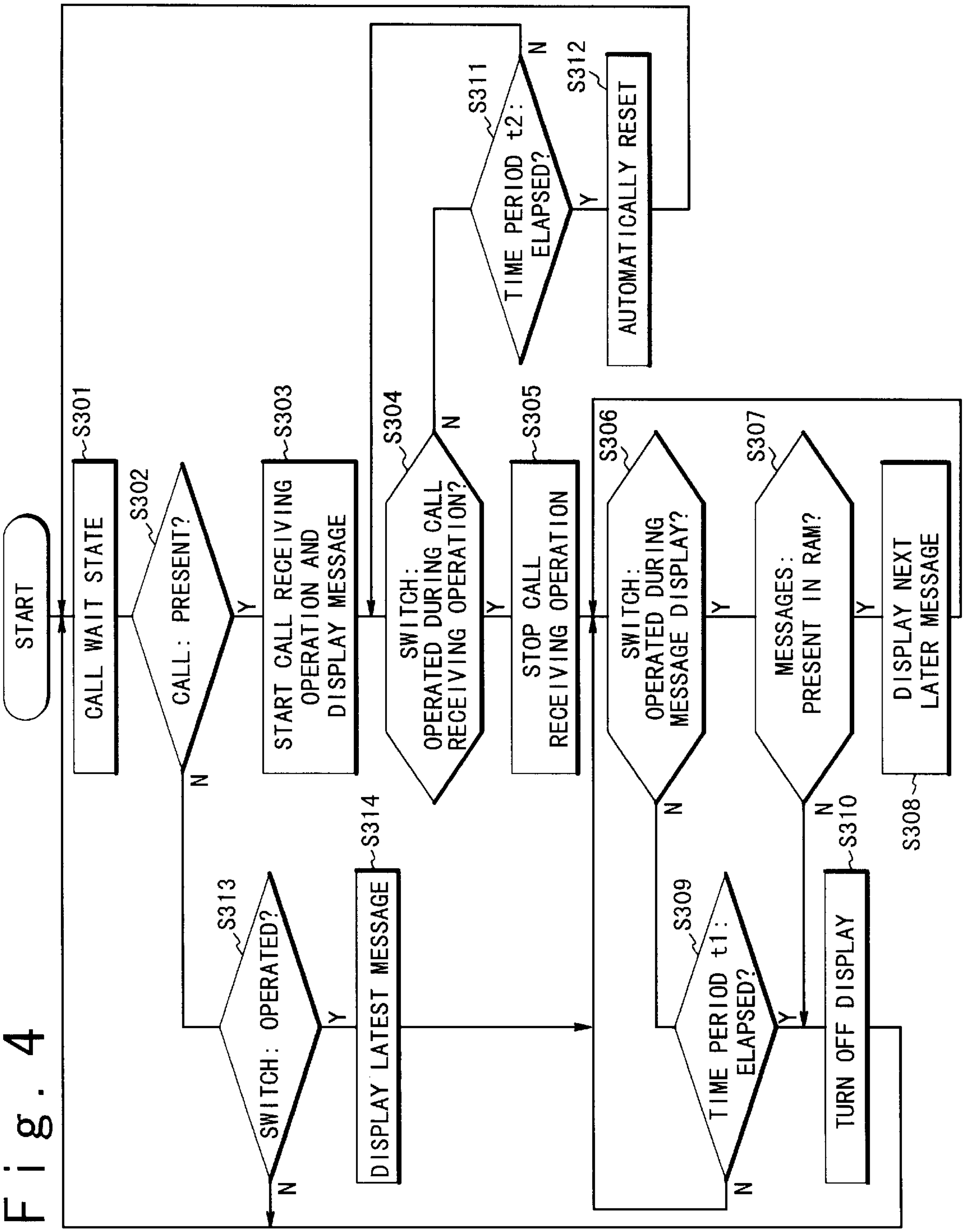
FIG. 4 is a flow chart of the stop operation of a call receiving operation after a message reception and the confirmation operation of a received message, in the wireless selective call receiver according to the first embodiment of the present invention.

First, FIG. 4 is a flow chart for the operation from the call receiving operation stop operation to the message confirmation operation after the message reception in the wireless selective call receiver according to the first embodiment of the present invention.

When the user turns on the switch (PW) 16, the wireless selective call receiver is set to a reception wait state (step S301). If a message with a call number of the wireless selective call receiver is received by the antenna (ANT) 1 in this state (Y in step S302), the above-mentioned call receiving operation is performed to output the speaker alert sound from the control unit (CTL) 4 to the speaker (SPK) 12 and at the same time to display the reception message data on the LCD 10 (step S303).

If the user pushes the switch (SW) 15 during this call receiving operation (Y in S304), the call receiving operation is stopped. However, the reception message data continues to be displayed on the LCD 10 just as it is (step S305).

If the user pushes the switch (SW) 15 during message display (Y in S306) and there is a message data which has been received previous to the reception message data currently displayed in the RAM 6 (Y in step S307), this previous reception message data is displayed as a new message data after the message currently displayed (step S308). Then, every time the user pushes the control switch (SW) 15, a new message data is displayed in the received order. The procedure from step S306 to step S308 is repeated until the earliest received message data which is stored in the RAM 6 is displayed.

Thereafter, if in step S307 there is no message data which has been received previously to the message currently displayed, the control returns to the reception wait state of step S301 after the display of the LCD 10 is turned off (step S310).

Also, if in step S306 the user does not push the control switch (SW) 15 during the message display, the display of the message data is continued until the preset time period t1 elapses and after this time period t1 elapses (Y in step S309), the message data display is turned off (step S310) and then the control returns to step S301.

Further, in step S304 the user does not push the control switch (SW) 15 during the call receiving operation, the call receiving operation is continued until a preset time period t2 elapses (N in step S311). After this time period t2 elapsed (Y in step S311), the call receiving operation is stopped, i.e., automatically reset (step S312). Then, the control returns to step S301.

Furthermore, in step S302 the user pushes the control switch (SW) 15 in the normal reception wait state in which the call receiving operation is not performed (Y in step S313), the latest reception message is displayed on the LCD 10 (step S314). Then, the control goes to step S306. On the other hand, if in step S313 the user does not push the control switch (SW) 15, the control returns to step S301 to maintain the reception wait state.

Next, the wireless selective call receiver according to the second embodiment of the present invention will be described. In the second embodiment, the control unit (CTL) further includes timers 4-3 to 4-5 for counting time periods t3, t4 and t5, respectivley. Also, the control switch (SW) 15 in the first embodiment shown in FIG. 2 is also used as the power supply switch of the wireless selective call receiver, in place of the switch (PW) 16. When the control switch (SW) 15 is continuously pushed during a preset time period t3, the power supply of the wireless selective call receiver can be turned on or off. Also, in a case where the power supply of the wireless selective call receiver is to be turned off, when the user continuously pushes the control switch (SW) 15 during the preset time period t3, the control unit (CTL) 4 displays a power-off informing data indicating that the power supply is turned off, during a preset time period t4. After the power-off informing data disappears after the preset time period t4 elapsed, the power supply of the wireless selective call receiver function is turned off. On the other hand, if the user pushes the control switch (SW) 15 while the power-off informing data is displayed, the switching operation to the power-off state is canceled.

Usually, for the purpose of reduction of power consumption, if any switch operation is not performed even in the operation state of the wireless selective call receiver, nothing is displayed on the LCD 10 shown in FIG. 2.

In the second embodiment, since it is possible for the user to recognize the display on the LCD 10 in the state in which the cover 18 is closed, when the user pushes the control switch (SW) 15 during the display of the power-off informing data to cancel the switching operation to the power-off state, the user can recognize a current time without doing any troublesome operation by performing a clock display during a predetermined time period t5.

Figure 5:
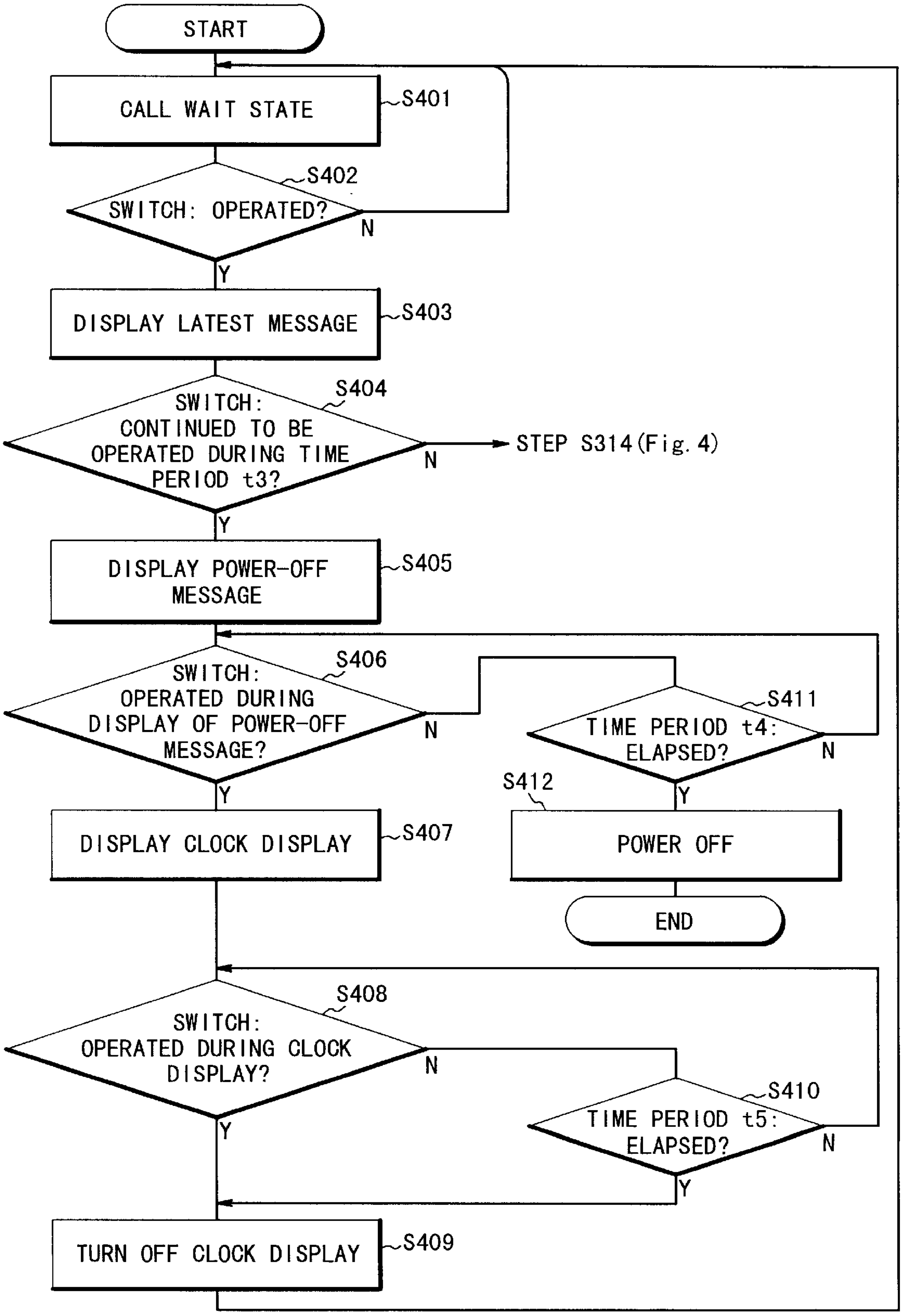
FIG. 5 is a flow chart of a power supply on or off operation of the wireless selective call receiver function in the wireless selective call receiver according to the second embodiment of the present invention.

FIG. 5 is a flow chart for an on or off operation of the power supply of the wireless selective call receiver according to the second embodiment of the present invention.

Figure 1A:
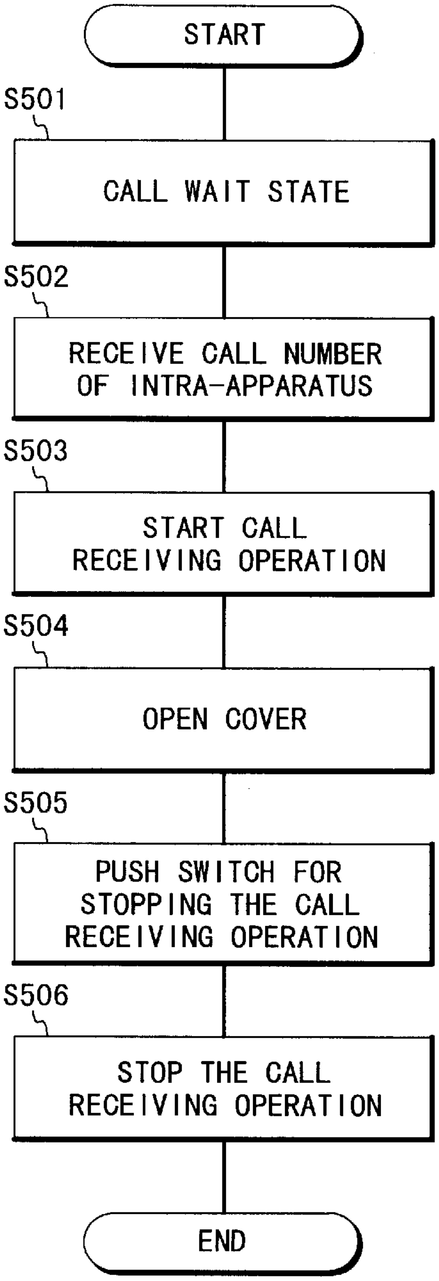
Fig. 1A PRIOR ART
FIGS. 1A and 1B are, respectively, a flow chart of a stop operation of a call receiving operation and a flow chart of a confirmation operation of reception of a message in an example of a conventional wireless selective call receiver.
Figure 1B:
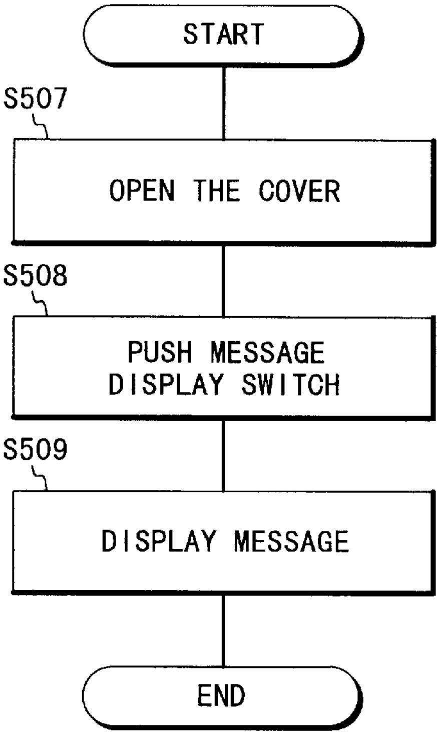
Fig. 1B PRIOR ART

Referring to FIGS. 1 and 5, the power supply of the wireless selective call receiver is turned on such that the wireless selective call receiver is set to the reception wait state (step S401). When the user pushes the control switch (SW) 15 (Y in S402), the latest one of the reception message data which has been stored in the RAM 6 is displayed on the LCD 10 (step S403).

If the user stops the pushing of the control switch (SW) 15 (N in step S404) before the preset time period t3 elapses, the control goes to step S314 shown in FIG. 4 to execute the confirmation operation of the reception message data. However, if the control switch SW 15 continues to be pushed until the preset time period t3 elapses (Y in step S404), the display of power-off informing data of the 10 wireless selective call receiver is performed on the LCD 10 (step S405).

If the user does not push the control switch (SW) 15 during the display of the power-off informing data (N in step S406), the display is turned off (Y in step S411) after the 15 display is performed during the preset time period t4. Then, the power supply of the wireless selective call receiver is also turned off (step S412). The control ends in this manner.

On the other hand, step S406 the user pushes the control switch (SW) 15 during the display of the power-off informing data, the power supply off operation is canceled. A clock display at this point is performed on the LCD 10 (step S407).

If the user does not push the control switch (SW) 15 25 during this clock display (N in step S408), the clock display is turned off (step S409) after the display is performed during a preset time period t5 (Y in step S410). Then, the control returns to step S401 to set the reception wait state again. Also, even if the user pushes the control switch (SW) 15 during the clock display (Y in step S408), the control goes to step S409 and thereafter it returns to step S401.

As described above, according to the present invention, the wireless selective call receiver has the management function of the data which contains telephone book data and scheduler data.

Also, the above-mentioned cover has a transparent window in the position which corresponds to the display section in the state in which the cover is closed. The pen is provided which is used to touch the operation panel and which is accommodated in a position detachable in the state in which the cover is closed. Therefore, in the wireless selective call receiver, the content displayed on the display section can be recognized in the state in which the cover is closed without opening the cover of the wireless selective call receiver. In addition, the wireless selective call receiver can execute the menu displayed on the display section in the state in which the cover is closed. In this manner, the operation of the wireless selective call receiver can be remarkably simplified and the operability can be improved.

The above-mentioned operations are executed by the operation of a switch for the call receiving operation stop operation and a switch for the reception message confirmation operation which are provided in the positions where it is possible to push them in the state which the cover is closed. The wireless selective call receiver is further composed of a switch for the power one or off of the wireless selective call receiver. However, a single switch may be used for the call receiving operation stop operation, the reception message confirmation operation and the power supply on or off operation of the wireless selective call receiver.

What is claimed is:

1. A wireless selective call receiver comprising:

a body section composed of a display panel, control means having a memory in said body section, and an operation unit, wherein said control means controls said display panel in response to an operation of said operation unit such that a message data is displayed on said display panel;

a cover section connected to said body section and comprising a cover for protecting said display panel, a hinge for moving said cover between open and closed states, and a transparent window in said cover in correspondence with said display panel such that a display on said display panel can be seen through said transparent window in a cover closed state, said operation unit being operable in the cover closed state; and a pen operable with said display panel to indicate data and instruction, said pen being operable with said display panel when said cover is in the closed state.

2. A wireless selective call receiver according to claim 1, wherein said operation unit includes a control switch for instructing stop of a call receiving operation to said control means, and for instructing display of a message to said control means.

3. A wireless selective call receiver according to claim 2, wherein said control switch further instructs power off to said control means.

4. A wireless selective call receiver according to claim 1, wherein said operation unit includes a first control switch for instructing stop of a call receiving operation to said control means, and a second control switch for instructing display of a message to said control means.

5. A wireless selective call receiver according to claim 4, wherein said operation unit includes a third control switch further instructs power off to said control means.

6. A wireless selective call receiver according to claim 1, wherein said control means includes:

first determining means for determining whether a call is received in a call wait state; and informing means for informing to a user that the call is received when the call is received in the call receiving state.

7. A wireless selective call receiver according to claim 6, wherein said control means includes means for control said display panel to display a latest message data when said operation unit is operated in the call wait state.

8. A wireless selective call receiver according to claim 6, wherein said control means includes:

second determining means for determining whether said operation unit is operated during the informing operation; and means for stopping the informing operation, for storing in said memory a message data received subsequently to the call, and for control said display panel to display the message data received subsequently to the call as a current message data, when said operation unit is operated during the informing operation.

9. A wireless selective call receiver according to claim 8, wherein said control means includes means for storing the message data received subsequently to the call in said memory, wherein said control means is set to the call wait state after the storing of the message data, when said operation unit is not operated during the informing operation.

10. A wireless selective call receiver according to claim 8, wherein said control means includes:

third determining means for determining whether said operation unit is operated while the current message data is displayed; and means for controlling said display panel to sequentially display as current message data message data which have been already received and stored in said memory, each time said operation unit is operated while the current message data is displayed.

11. A wireless selective call receiver according to claim 10, wherein said control means is set to the call wait state when said operation unit is not operated while the current message data is displayed.

12. A wireless selective call receiver according to claim 10, wherein said control means includes:

fourth determining means for determining whether said operation unit continues to be operated during a first predetermined time period; and means for controlling said display panel to display a power-off message data when said operation unit continues to be operated during the first predetermined time period.

13. A wireless selective call receiver according to claim 12, wherein said control means includes:

fifth determining means for determining whether said operation unit is operated while the power-off message data is displayed; and means for turning off a power supply when said operation unit is not operated while the power-off message data is displayed, for controlling said display panel to perform a clock display when said operation unit is operated while the power-off message data is displayed, and for turning off the power supply when said operation unit is operated while the clock display is performed or after the clock display is performed during a second predetermined time period.

14. A method of receiving a call with a message data in a wireless selective call receiver, comprising the steps of:

informing reception of a call with a message data to a user when the call is received in a call wait state;

displaying a message data on a display panel that the user can see through a transparent window in a hinged cover when the cover is closed, wherein the transparent window is provided in correspondence with the display panel, and the cover is movable between open and closed states;

stopping the informing operation in response to an operation of a first control switch which is operable in the cover closed state; and writing data and instructions to the display panel with a pen when the cover is in a closed state.

15. A method according to claim 14, further comprising the step of displaying message data which have been previously received and stored in a memory on the display panel in response to an operation of a second control switch.

16. A method according to claim 15, wherein a single control switch is used in common as the first and second control switches.

17. A method according to claim 15, further comprising the step of turning off a power supply of the wireless selective call receiver in response to an operation of a third control switch.

18. A method according to claim 17, wherein a single control switch is used in common as the first to third control switches.

* * * * *